United States Patent [19]

Stephenson

[11] 4,232,882
[45] Nov. 11, 1980

[54] MOTORIZED PASSIVE SEAT BELT SYSTEM

[75] Inventor: Robert L. Stephenson, Sterling Heights, Mich.

[73] Assignee: Allied Chemical Corporation, Morris Township, Morris County, N.J.

[21] Appl. No.: 834,936

[22] Filed: Sep. 20, 1977

[51] Int. Cl.³ .............................................. B60R 21/10
[52] U.S. Cl. .................................................... 280/804
[58] Field of Search ............... 280/745, 744, 746, 747; 296/155; 297/388, 384

[56] References Cited

U.S. PATENT DOCUMENTS

| | | | |
|---|---|---|---|
| 3,770,078 | 11/1973 | Kappel et al. | 280/111 |
| 3,794,411 | 3/1974 | Takada | 280/745 |
| 3,815,934 | 6/1974 | Weststrate | 280/745 |
| 3,842,929 | 10/1974 | Wada et al. | 280/745 X |
| 3,860,260 | 1/1975 | Kazaoka et al. | 280/745 |
| 3,977,701 | 8/1976 | Weman | 280/745 |
| 4,029,339 | 6/1977 | Kaneko et al. | 280/745 |
| 4,047,737 | 9/1977 | Grossbach | 280/745 |
| 4,061,365 | 12/1977 | Nagano et al. | 280/745 |
| 4,072,323 | 2/1978 | Shimokawa et al. | 280/745 |
| 4,087,118 | 5/1978 | Shimogawa et al. | 280/745 |

FOREIGN PATENT DOCUMENTS 2437056 12/1976 Fed. Rep. of Germany ........... 280/802

*Primary Examiner*—Robert B. Reeves
*Assistant Examiner*—Gene A. Church
*Attorney, Agent, or Firm*—Roger H. Criss

[57] ABSTRACT

A passive seat belt system including a movable rod connected to a seat belt and a hook member connected to the rod. The rod is driven by an electric motor actuated in response to opening and closing of a vehicle door. The rod is moved to a forward position when the door is opened, with the hook member being moved into contact with a rear portion of the belt so as to prevent interference of the belt with ingress to or egress from the vehicle. The rod is moved to a rearward position when the door is closed, with the hook member being moved out of contact with the belt.

12 Claims, 3 Drawing Figures

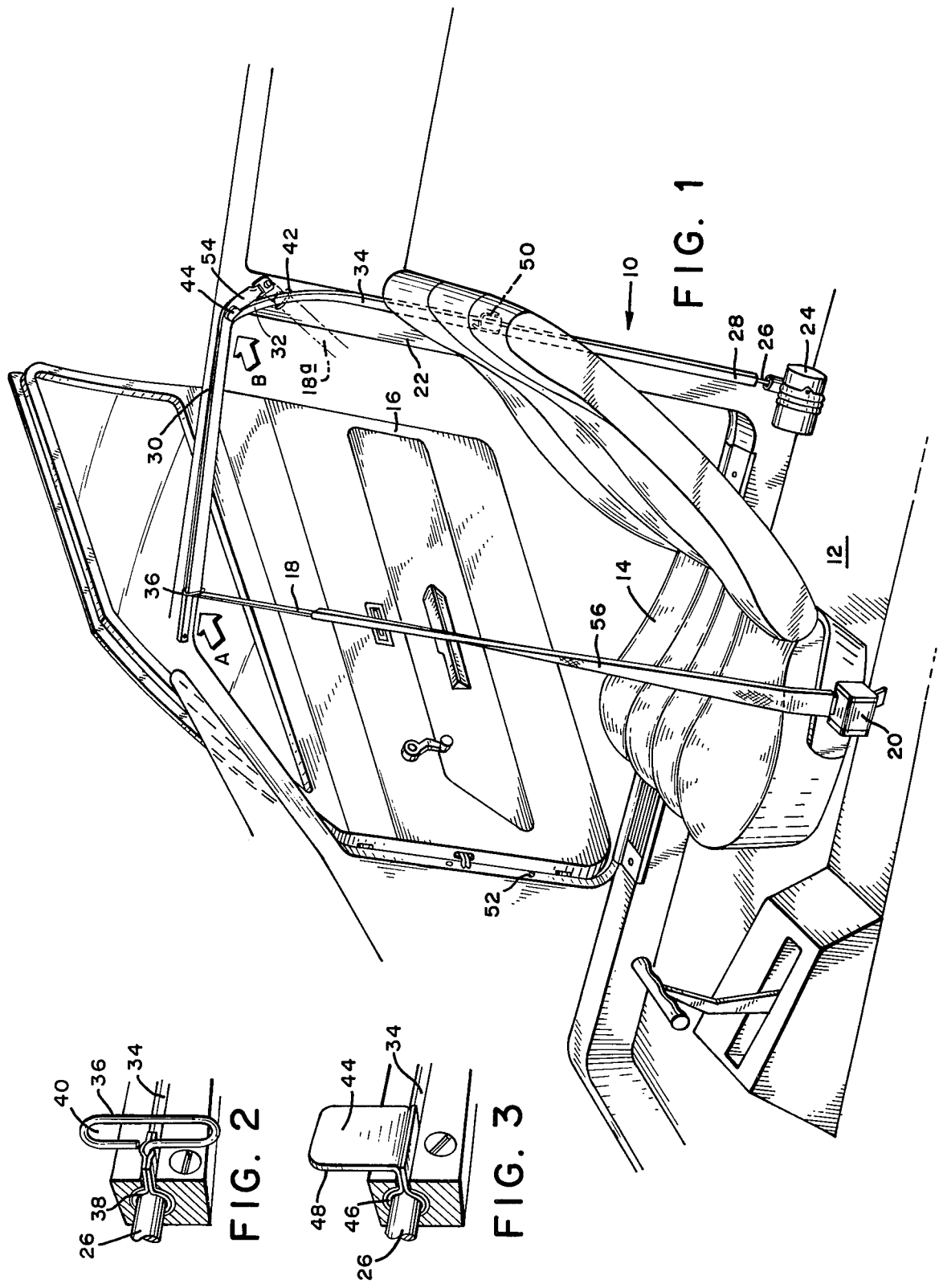

MOTORIZED PASSIVE SEAT BELT SYSTEM

BACKGROUND OF THE INVENTION

1. Field of the Invention

This invention relates to passive seat belt systems, especially such systems including driving motors.

2. Description of the Prior Art

Passive seat belt systems have been suggested in which the seat belt is automatically positioned about a vehicle occupant before the vehicle is operated, e.g., after the door is closed. Such proposed systems include mechanical devices as well as motorized electrical devices. Examples of the latter are those disclosed, for example, in the following U.S. Pat. Nos. 4,029,339; 4,004,829; 3,860,260; 3,833,239; 3,815,934; and 3,770,078. It would be desirable, however, if a simple means were provided to effectively move the belt out of the way to thereby permit entry and exit of the vehicle by an occupant.

SUMMARY OF THE INVENTION

In a passive seat belt system in a vehicle including a door and a seat belt adapted to be positioned about an occupant in a seat, one end of said belt being connected to a retractor and the other end of said belt being mounted to said vehicle, the improvement comprising:

(a) rod means having one portion connected at said seat belt;

(b) hook means connected to said rod means and engageable with said belt;

(c) an electric motor to which one end of said rod means is drivingly connected;

(d) switch means in said vehicle actuated in response to opening and closing of said door, said switch means being in electrical connection with said motor so that when said switch means is actuated, said motor is actuated; and (e) said rod means being extended from said motor and being moved to a forward position when said door is opened to thereby move said seat belt to a forward position permitting free ingress to and egress from said vehicle, with said hook means supporting a portion of said belt, and said rod means being moved by said motor to a rearward position when said door is closed to thereby move said seat belt to a rearward occupant-engaging position.

Accordingly, this invention provides a simple but effective means to move the seat belt to a non-interfering position upon opening of the door.

BRIEF DESCRIPTION OF THE DRAWINGS

FIG. 1 is a perspective view of the passive seat belt system of this invention.

FIG. 2 is a view taken along arrow A of FIG. 1.

FIG. 3 is a view taken along arrow B of FIG. 1.

DESCRIPTION OF THE PREFERRED EMBODIMENTS

In accordance with a preferred embodiment of this invention, the passive seat belt system, generally indicated at 10, is provided in vehicle 12, such as an automobile, having a seat, shown as bucket seat 14, and an adjacent door 16. Seat belt 18 has one end which is wound up on a conventional retractor 20 mounted, for example, adjacent to the opposite side of seat 14 from door 16. Retractor 20 may be of any suitable type, such as a vehicle sensitive retractor. The other end of seat belt 18 is mounted by suitable means to a structural part of the vehicle, such as "B" pillar 22, at a position above the height of an occupant seated in his seat.

Conventional electric motor 24 mounted, for example, on the lower portion of pillar 22, includes a winding device upon which a flexible rod 26 is wound. Motor 24 is a reversible electric motor. Rod 26 is suitably formed of plastic material. As can be seen, the rod 26 is similar to plastic rods utilized with conventional motorized telescoping power antennas; indeed, motor 24 may be a motor similar to that associated with such power antenna.

Rod 26 is guided through track 28 which is partially mounted on pillar 22 and on roof edge 30 of vehicle 12. An intermediate portion 32 of track 28 is curved between substantially linear portions. At least a portion of track 28, including intermediate portion 32, includes a groove 34 extending to the interior of track 28 in which rod 26 moves. A ring 36 is mounted at one location to rod 26 and extends through groove 34 as shown in FIG. 2. Ring 36 is preferably in the form of a conventional D-ring. Ring 36, which may be affixed to rod 26 by any suitable means, such as by clamp 38, is provided with an open central portion 40 through which belt 18 passes. As rod 26 moves, as is referred to in detail below, ring 36 moves from a forward position to a rearward position 42, shown in dotted lines, adjacent to pillar 22.

Also mounted to rod 26 is a hook 44 which likewise may be affixed to rod 26 by a clamp 46. Hook 44 has a substantially L-shape and includes a belt engaging segment 48. Hook 44 is mounted to rod 26 at a location closer to motor 24 than ring 36. Like ring 36, hook 44 has a forward position and a rearward position, indicated by dotted lines at 50. Mounted adjacent to door 16 is a conventional switch 52 which is an electrical connection with motor 24, which is connected to a suitable source of electricity, such as a vehicle battery (not shown).

In operation, with door 16 in its closed position, ring 36 and hook 44 assume positions 42 and 50, respectively. When door 16 is opened, switch 52 is actuated which in turn actuates motor 24. Rod 26 is moved in an outwards direction from the winding drum of motor 24. As rod 26 moves upwards along the portion of track 28 on pillar 22 and forwards on the portion on track 28 on roof edge 30, ring 36 is moved forwards and moves belt 18 therewith to a forward position at which belt 18 does not interfere with ingress or egress of the vehicle occupant. Movement of rod 26 continues until ring 36 and hook 44 reach their forward positions. A conventional limit switch may be provided in motor 24 for this purpose. As hook 44 moves along curved portion 32 of track 28, its portion 48 engages a portion 54 of seat belt 18 adjacent to its mounting end. Hook 44 maintains portion 54 in an elevated position and thereby prevents the portion of belt 18 between ring 36 and hook 44 from dropping downwards and interfering with entry to or exit from the vehicle.

Assuming the occupant is entering the vehicle, once he sits in his seat 14 and closes the door 16, switch 52 is again actuated which in turn actuates motor 44 to reverse its winding motion and winds up rod 26. As rod 26 is wound up, it moves ring 36 and hook 44 rearward and downward towards motor 24. As hook 44 moves into curved portion 32 of track 28, it releases portion 54 of belt 18. Also, ring 36 moves belt 18 rearward to a position indicated at 18a in dotted lines, adjacent to pillar 22. Rearward motion of motor 24 is stopped by suitable means, such as a limit switch. When rod 26 has reached its rearward position, belt 18 is now positioned in a rearward, occupant-restraining position. Any excess slack in belt 18 is taken up by a rewind spring of retractor 20.

It may be desirable to include a plastic sleeve 56 around the portion of belt 18 that contacts the occupant's torso in order to prevent rubbing of belt 18 against the wearer, as is disclosed in copending U.S. Application Ser. No. 828,450 of Joseph Cachia, filed Aug. 29, 1977.

Although the foregoing description relates specifically to a passive seat belt system in which a single belt and single retractor is utilized, it is to be understood that any suitable seat belt system may be utilized together with the rod means of this invention. For example, separate lap and shoulder belts may be provided and which may be connected to rod 26 by rings 36 or the like. Also, belt 18 may be in the form of a continuous loop belt which includes shoulder and lap portions as is generally known and which likewise is in contact with rod 26.

It is further to be understood that variations and modifications of the present invention may be made without departing from the scope thereof. It is also to be understood that the present invention is not to be limited by the specific embodiment disclosed herein but only in accordance with the appended claims when read in light of the foregoing specification.

I claim:

1. In a passive seat belt system in a vehicle including a door and a seat belt adapted to be positioned about an occupant in a seat, one end of said belt being connected to a retractor and the other end of said belt being mounted to said vehicle, the improvement comprising:
   (a) rod means having one portion connected at said seat belt;
   (b) hook means connected to said rod means and engageable with said belt;
   (c) an electric motor to which one end of said rod means is drivingly connected;
   (d) switch means in said vehicle actuated in response to opening and closing of said door, said switch means being in electrical connection with said motor so that when said switch means is actuated, said motor is actuated; and
   (e) said rod means being extended from said motor and being moved to a forward position when said door is opened to thereby move said seat belt to a forward position permitting free ingress to and egress from said vehicle, with said hook means supporting a portion of said belt, and said rod means being moved by said motor to a rearward position when said door is closed to thereby move said seat belt to a rearward occupant-engaging position, said hook means being movable into supporting engagement with said belt upon movement of said rod means to its forward position upon opening of said door and said hook means being movable out of supporting engagement with said belt upon movement of said rod means to its rearward position upon closing of said door.

2. The passive seat belt system of claim 1 wherein said rod means is connected to said seat belt through a ring means.

3. The passive seat belt system of claim 2 wherein said ring means is in the form of a D-ring.

4. The passive seat belt system of claim 1 wherein said hook means is engageable with a portion of said seat belt adjacent to said other end when said rod means is moved to its forward position.

5. The passive seat belt system of claim 1 wherein said rod means is mounted in a track provided in said vehicle.

6. The passive seat belt system of claim 5 wherein a portion of said track is mounted on a pillar of said vehicle and another portion of said track is mounted along an edge of the roof of said vehicle adjacent said door.

7. The passive seat belt system of claim 1 wherein said rod means is formed of plastic material.

8. The passive seat belt system of claim 1 including a sleeve surrounding a portion of said belt which contacts the occupant's torso.

9. The passive seat belt system of claim 1 wherein said retractor is mounted on the side of said seat opposite from said door.

10. The passive seat belt system of claim 6 wherein said hook means is positioned on said track on said pillar when said door is closed and said hook means is out of engagement with said belt.

11. The passive seat belt system of claim 10 wherein said pillar is adjacent said seat.

12. The passive seat belt system of claim 1 wherein said hook means has a substantially L-shape, one leg of said L being engageable with said belt.

* * * * *